United States Patent
Ding et al.

(10) Patent No.: US 12,536,412 B1
(45) Date of Patent: Jan. 27, 2026

(54) PRODUCT QUALITY DETECTION METHOD IN COMPLEX INDUSTRIAL PROCESS FUSING PRIOR KNOWLEDGE

(71) Applicant: NORTHEASTERN UNIVERSITY, Shenyang (CN)

(72) Inventors: Jinliang Ding, Shenyang (CN); Datong Li, Shenyang (CN); Tongkang Zhang, Shenyang (CN); Jun Lu, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 0 days.

(21) Appl. No.: 19/097,424

(22) Filed: Apr. 1, 2025

(30) Foreign Application Priority Data

Jul. 25, 2024 (CN) .......................... 202411000499.6

(51) Int. Cl.
  *G06N 3/0464* (2023.01)
  *G06N 3/08* (2023.01)
(52) U.S. Cl.
  CPC ............. *G06N 3/0464* (2023.01); *G06N 3/08* (2013.01)
(58) Field of Classification Search
  CPC .............................. G06N 3/0464; G06N 3/08
  See application file for complete search history.

(56) References Cited

U.S. PATENT DOCUMENTS

| | | | |
|---|---|---|---|
| 2021/0166088 A1* | 6/2021 | Chen .................... | G06V 40/171 |
| 2023/0206942 A1* | 6/2023 | Schneider ............. | G01M 15/12 704/200 |
| 2025/0084006 A1* | 3/2025 | Knop .................. | C04B 40/0032 |

FOREIGN PATENT DOCUMENTS

| | | |
|---|---|---|
| CN | 108776831 A | 11/2018 |
| CN | 112560337 A | 3/2021 |

OTHER PUBLICATIONS

Lyu, Peilun, et al. "A novel feature fusion framework for industrial automation single-multiple object detection." IEEE Transactions on Industrial Informatics (2024). (Year: 2024).*

Wang, Huan, et al. "An intelligent digital twin method based on spatio-temporal feature fusion for IoT attack behavior identification." IEEE Journal on Selected Areas in Communications 41.11 (2023): 3561-3572. (Year: 2023).*

(Continued)

*Primary Examiner* — Miranda M Huang
*Assistant Examiner* — Sidney Vincent Bostwick
(74) *Attorney, Agent, or Firm* — MUNCY, GEISSLER, OLDS & LOWE, P.C.

(57) ABSTRACT

Provided is a product quality detection method in a complex industrial process fusing prior knowledge. Related data of product production in the complex industrial process is acquired to serve as samples; The acquired samples are preprocessed and a training data set is constructed by the preprocessed samples; a product quality detection model in the complex industrial process fusing prior knowledge is constructed; the product quality detection model is trained by the training data set; and the trained quality detection model is used for product quality detection to obtain product quality. The present invention designs that feature extraction on multiple scales is supported by a multi-scale feature extraction network with convolutional kernels with different sizes, and designs that the extracted features of each process are fused by a multi-process feature fusion method of the prior knowledge, thereby obtaining more accurate feature representation and increasing the production benefit.

3 Claims, 2 Drawing Sheets

(56) References Cited

OTHER PUBLICATIONS

Han, Yinghua, et al. "Multirelational fusion graph convolution network with multiscale residual network for fault diagnosis of complex industrial processes." IEEE Transactions on Instrumentation and Measurement 73 (2024): 1-15. (Year: 2024).*

Yin Yanchao et al., "Multi process process quality prediction method integrating multi-channel CNN BiGRU and time mode attention mechanism", Computer Integrated Manufacturing System, Aug. 2, 2023, 38 pages.

* cited by examiner

PRODUCT QUALITY DETECTION METHOD IN COMPLEX INDUSTRIAL PROCESS FUSING PRIOR KNOWLEDGE

TECHNICAL FIELD

The present invention relates to the technical fields of complex industrial process modeling and product quality detection, and in particular, relates to a product quality detection method in a complex industrial process fusing prior knowledge.

BACKGROUND

A complex industrial process is a crucial pillar of economic development, covering production fields such as chemical industry, oil refining, metallurgy, mineral processing and steel production. These processes usually include a plurality of continuous production processes. A final product can be obtained by processing raw materials step by step, so that the product quality is closely related to each process. Therefore, the product quality is an important indicator reflecting a production status. However, current product quality detection usually depends on sampling and manual detection, which is required to be performed after production is completed, resulting in high cost and a certain degree of lag, thereby limiting the real-time monitoring and quality control of the production process.

In recent years, with the development of informatization, digitalization and artificial intelligence technology in the complex industrial process, data-driven modeling methods have been widely used in the field of product quality detection. By this method, the product quality is predicted by establishing a relationship model between production process data and product quality. However, the complex industrial process has the characteristic of multi-process production, and the processes affect each other and have complex relationships. The traditional data-driven modeling method is often difficult to accurately describe the complex relationship, resulting in the inability to obtain better feature representation, thereby affecting the performance of a product quality detection model.

Since the complex industrial production process involves the transformation from raw materials to products, the raw materials will undergo different processing forms in different processes before the final product is obtained, so that process data in each process is different, and it is necessary to respectively extract the feature of each process. A large number of sensing and monitoring devices are used for real-time monitoring and data acquisition, thereby accumulating a large number of time series data. These time series data usually have the multi-variable and multi-scale characteristics. The traditional feature extraction method often only considers the features on a single time scale, thereby ignoring the correlation among a plurality of variables. In addition, the traditional modeling method usually only extracts the feature on a single scale and cannot accurately capture the change of data on different scales, so it is difficult to extract more complete data features.

Chinese patent publication No. CN112560337A discloses "SMART MODELING METHOD AND APPARATUS OF COMPLEX INDUSTRIAL PROCESS DIGITAL TWIN SYSTEM, DEVICE, AND STORAGE MEDIUM." A system identification method based on a mechanism model is combined with a deep learning method based on big data, and a smart model of the complex industrial process digital twin system is established by an end-side cloud collaboration mode. Chinese patent publication No. CN108776831A discloses "COMPLEX INDUSTRIAL PROCESS DATA MODELING METHOD BASED ON DYNAMIC CONVOLUTIONAL NEURAL NETWORK." A data prediction model of a complex industrial process indicator is established based on the dynamic convolutional neural network, and the correlation of a sensitive variable is effectively considered. However, Chinese patent publication No. CN112560337A does not consider the problem of feature extraction of time series data in the complex industrial process. Chinese patent publication No. CN112560337A and Chinese patent publication No. CN108776831A do not consider the multi-process problem faced by process data modeling in a complex industrial process scenario.

SUMMARY OF THE INVENTION

In view of the shortcomings in the prior art, the present invention provides a product quality detection method in a complex industrial process fusing prior knowledge, so as to solve the problems of feature fusion among multiple processes and feature extraction of time series data in processes faced by complex industrial process modeling and to be used for product quality detection.

A technical solution of the present invention is as follows.

A product quality detection method in a complex industrial process fusing prior knowledge includes the following steps.

S1: acquiring related data of product production in the complex industrial process to serve as samples.

The related data includes production process data of each process acquired by each detection sensor in a production process and a product quality label marked after the product production is completed.

S2: preprocessing the acquired samples, and constructing a training data set by the preprocessed samples, where the preprocessing includes data cleaning, data alignment and normalization.

S2.1: cleaning the acquired samples by a data cleaning algorithm, and removing the samples including sampling anomalies and not-a-number values in the acquired production process data to obtain cleaned samples.

S2.2: performing the data alignment and the data normalization on the cleaned samples and constructing the training data set.

Specifically, first, the production process data in the cleaned samples is subjected to data alignment operation, so that the production process data of each sample have a same length m; then, the aligned production process data is subjected to normalization operation; and finally, production process data $X^p$ corresponding to each process after preprocessing is obtained, where p is a serial number of the processes and p=1,2, . . . ,n, and n is a number of the corresponding processes in the production process. Therefore, each sample is represented by $X_i = \{X^1, X^2, \ldots, X^n\}$, and i is a serial number of the samples, so that the training data set $$D = \{X_i, y_i\}_{i=1}^N$$

is finally obtained, where N is a number of the samples, and $y_i$ is a product quality label corresponding to the sample $X_i$.

Preferably, the data alignment in S2.2 adopts a linear interpolation algorithm.

S3: constructing a product quality detection model in the complex industrial process fusing the prior knowledge.

The product quality detection model in the complex industrial process fusing the prior knowledge includes n feature extraction networks, a feature fusion module and a quality detection module.

The feature extraction networks are configured to perform feature extraction on the production process data in each process to obtain a feature representation corresponding to the production process data of each process.

The feature fusion module is configured to splice input feature representation corresponding to the production process data of each process to obtain a spliced feature representation, then take mutual influence of each process as the prior knowledge, and fuse the spliced feature representation by the prior knowledge to finally obtain the feature representation of the sample.

The prior knowledge is represented by an adjacent matrix, the adjacent matrix $A=[\alpha_{pq}]_{n\times n}$ represents an influence relationship among n processes in the production process, $\alpha_{pq}\in\{0,1\}$ indicates whether a $p^{th}$ process generates influence on production of a $q^{th}$ process, 0 indicates that no influence is generated, and 1 indicates that influence is generated.

The quality detection module is a two-layer full-connection network and is configured to classify the input feature representations of the samples and output predicted product quality.

Further, each of the feature extraction networks includes a plurality of multi-scale feature extraction modules that are connected sequentially, each of the multi-scale feature extraction modules includes two branches, a first branch first extracts a feature of the input feature representation corresponding to the production process data on time series through a one-dimensional convolutional network and then extract a feature on a variable dimension through a one-dimensional convolutional network with a same size to obtain a first branch feature, a second branch has a same structure as that of the first branch, convolutional kernels of the convolutional networks are different in size, the feature representation corresponding to the production process data is input, a second branch feature is output, then the first branch feature and the second branch feature are added and fused to serve as an output feature of the multi-scale feature extraction module, and the output feature is input to a next cascaded multi-scale feature extraction module until a last multi-scale feature extraction module outputs the feature representation of the sample.

S4: training the product quality detection model in the complex industrial process fusing the prior knowledge by the training data set to obtain the trained product quality detection model in the complex industrial process fusing the prior knowledge.

S4.1: respectively inputting the production process data of each process in the samples in the training data set into the corresponding feature extraction network to obtain the feature representation corresponding to the production process data of each process.

A feature extraction process of the feature extraction network is as follows:

$$z_p = f_p(X^p).$$

Where $z_p$ is the feature representation of the $p^{th}$ process, and $f_p(\cdot)$ represents the feature extraction network corresponding to the $p^{th}$ process.

A multi-scale feature extraction module in the feature extraction network adopts convolutional kernels with various sizes to perform feature parallel extraction. Specifically, convolutional kernels $W_{t1}$ and $W_{t2}$ of $1\times k_{1i}$ and $1\times k_2$ are adopted to slidingly extract features on different time scales, convolutional kernels $W_{s1}$ and $W_{s2}$ of $k_1\times 1$ and $k_2\times 1$ are respectively adopted to extract features on different variable scales, and $k_1$ and $k_2$ are sizes of the convolutional kernels.

The multi-scale feature extraction module is as follows:

$$z_{p\_out}=W_{s1}\times(W_{t1}\times z_{p\_in})+W_{s2}\times(W_{t2}\times z_{p\_in}).$$

Where $z_{p\_in}$ represents an input feature of the feature extraction module, $z_{p\_out}$ represents an output feature, $W_{t1}$ is the convolutional kernel of a first convolutional network in the first branch, $W_{s1}$ is the convolutional kernel of a second convolutional network in the first branch, $W_{t2}$ is the convolutional kernel of a first convolutional network in the second branch, and $W_{s2}$ is the convolutional kernel of a second convolutional network in the second branch.

S4.2: analyzing a production technology in the complex industrial process to obtain the mutual influence among the processes to serve as the prior knowledge.

S4.3: performing feature fusion on the feature representation corresponding to the extracted production process data of each process by the obtained prior knowledge to finally obtain the feature representation of the sample, and predicting the product quality by the quality detection module to obtain the predicted product quality.

Specifically, the feature fusion based on the prior knowledge in S4.3 is shown as the following formula:

$$\hat{y}=f_c(A\text{concat}(z_1, z_2, \ldots, z_n)).$$

Where $\hat{y}$ represents a predicted value of the product quality by the product quality detection model in the complex industrial process fusing the prior knowledge, concat(•) represents splicing operation of the feature representation of each process, and $f_c(\bullet)$ represents the quality detection module.

S4.4: after reaching set training rounds or converging a loss function, ending the training to obtain the trained product quality detection model in the complex industrial process fusing the prior knowledge.

Specifically, the loss function in S4.4 is a cross entropy loss function, and a loss between the product quality predicted value and a product quality real value is calculated by a cross entropy loss $L_{CE}$, as shown in the following formula:

$$L_{CE} = -\sum_{j=1}^{c} y_j \log(\hat{y}_j).$$

Where c represents a number of product quality types, j is a serial number of the product quality types, $y_1$ is the product quality real value, and $\hat{y}_j$ is the product quality predicted value.

S5: deploying the trained quality detection model in the complex industrial process fusing the prior knowledge for product quality detection in the complex industrial process to obtain product quality.

Compared with the prior art, the present invention has the following beneficial effects.

The present invention provides a product quality detection method in a complex industrial process fusing prior knowledge, for solving the problems of feature extraction of process data in the process and feature fusion among multiple processes faced in the complex industrial production process. In view of the problem of extraction of data features acquired by sensing in each process, the present invention designs that feature extraction on multiple scales is supported by the multi-scale feature extraction network with convolutional kernels with different sizes, thereby obtaining more comprehensive feature representation in the process. In view of the multi-process problem faced by the complex production process, the present invention designs that the extracted features of each process are fused by the multi-process feature fusion method of the prior knowledge, thereby obtaining more accurate feature representation. The present invention provides an effective product quality detection method for the complex industrial process, thereby increasing the production benefit.

DETAILED DESCRIPTION OF THE EMBODIMENTS

The present invention is described in detail below with reference to the accompanying drawings and embodiments.

In view of the problem of extraction of data features acquired by sensing in each process, the present invention designs that feature extraction on multiple scales is supported by the multi-scale feature extraction network with convolutional kernels with different sizes, thereby obtaining more comprehensive feature representation in the process. In view of the multi-process problem faced by the complex production process, the present invention designs that the extracted features of each process are fused by the multi-process feature fusion method of the prior knowledge, thereby obtaining more accurate feature representation.

Figure 1:
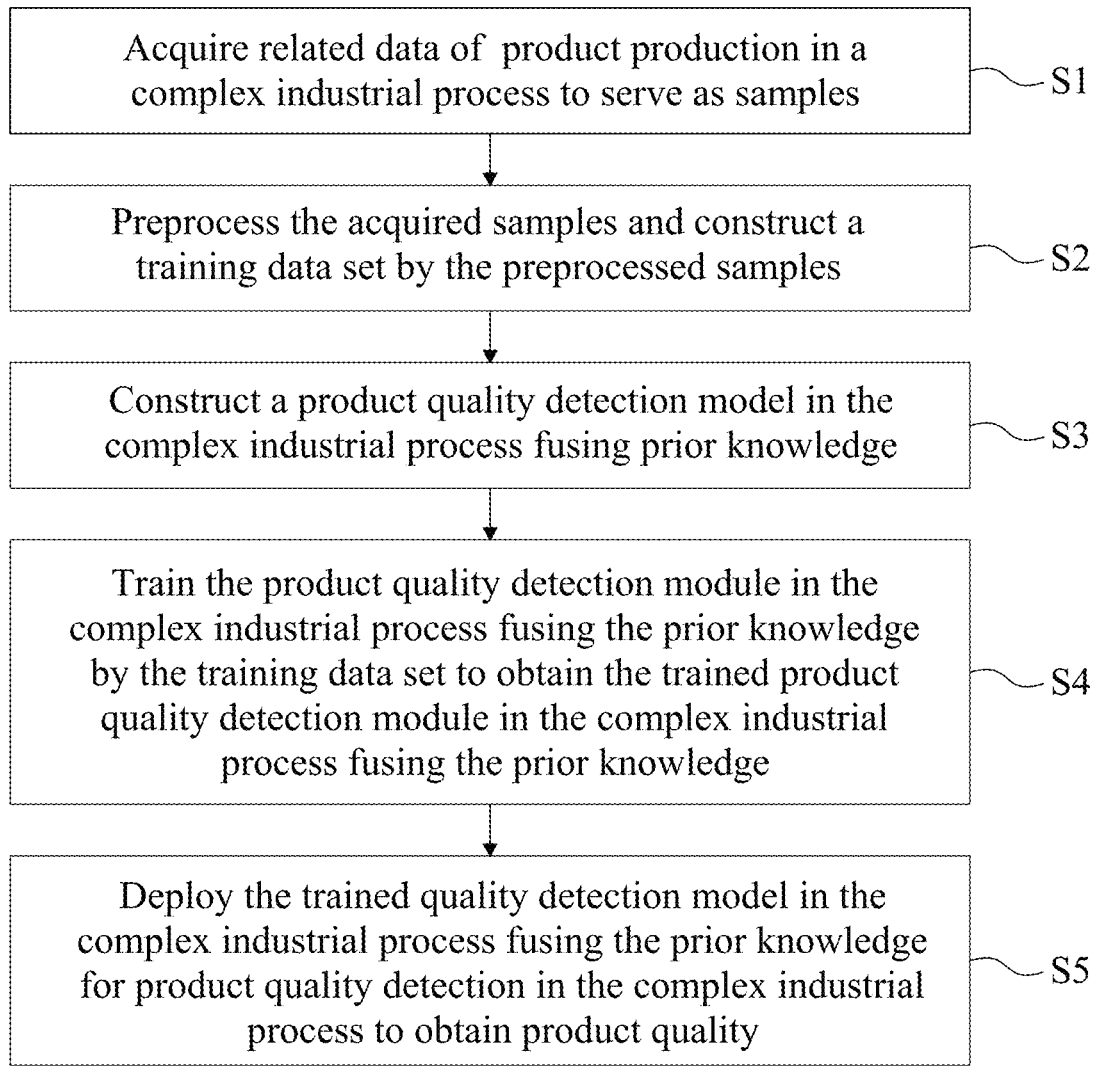
FIG. 1 is a flow schematic diagram of a product quality detection method in a complex industrial process fusing prior knowledge according to an embodiment of the present invention.

The present invention provides a product quality detection method in a complex industrial process fusing prior knowledge, which uses a collected process data training model to detect the product quality. In this embodiment, a method for detecting the plate shape quality of a thick plate product in the thick plate production process, as shown in FIG. 1, includes the following steps.

S1: production process data of each process in the production process of thick plate products is acquired by a monitoring sensor deployed in the production process of the thick plate products to serve as samples, and thick plate shape quality label information is obtained.

In this embodiment, in step S1, the acquired production process data includes monitoring data of each sensor of a heating process, a rolling process and a cooling process in the thick plate production process. Specifically, the acquired data includes a slab temperature in a heating process of the heating process; a rolling force and a roll bending force in the rolling process; and a temperature of a steel plate at each process in the cooling process, such as a finish rolling temperature, a start cooling temperature and a finish cooling temperature. The thick plate shape quality label information is acquired by combining a plate shape detection instrument with manual marking detection after the main product process is completed. S2: preprocessing the acquired samples, and constructing a training data set by the preprocessed samples, where the preprocessing includes data cleaning, data alignment and normalization.

S2.1: the acquired samples are cleaned by a data cleaning algorithm, and the samples including sampling anomalies and not-a-number (NaN) values in the acquired production process data are removed to obtain cleaned samples.

S2.2: the data alignment and the data normalization are performed on the cleaned samples and the training data set is constructed.

First, the data is subjected to data alignment operation, and the data have a same length by a linear interpolation processing method. In this embodiment, a length of the aligned samples is m=36. Then, the interpolated data is subjected to normalization operation to finally obtain data $X^p$ corresponding to each process, where p=1,2, . . . ,n, and n is a number of the corresponding processes in the production process. The production processes mainly involved in this example include heating, rolling and cooling, and correspondingly, n=3. Therefore, each sample data may be expressed as $X_i=\{X^1, X^2, \ldots, X^n\}$. Correspondingly, a data set $$D = \{X_i, y_i\}_{i=1}^N$$

for model training can be finally obtained, where N is a number of the samples, and $y_i$ is a manually marked real product quality label of the corresponding sample $X_i$. Preferably, data alignment in S2.2 adopts a linear interpolation algorithm.

S3: constructing a product quality detection model in the complex industrial process fusing the prior knowledge.

Figure 2:
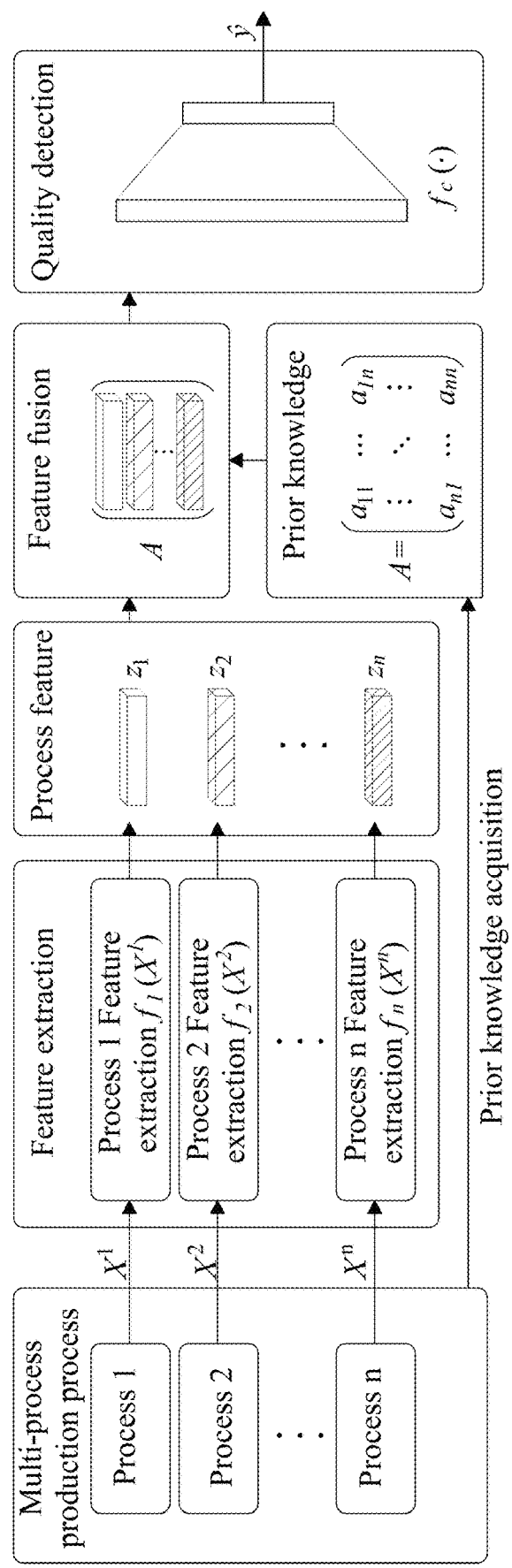
FIG. 2 is a structural block diagram of a product quality detection model in a complex industrial process fusing prior knowledge according to an embodiment of the present invention.

The product quality detection model in the complex industrial process fusing prior knowledge includes n feature extraction networks, a feature fusion module and a quality detection module, as shown in FIG. 2.

The feature extraction networks are configured to perform feature extraction on the production process data in each process to obtain a feature representation corresponding to the production process data of each process.

The feature fusion module is configured to splice input feature representation corresponding to the production process data of each process to obtain a spliced feature representation, then take mutual influence of each process as the prior knowledge, and fuse the spliced feature representation by the prior knowledge to finally obtain the feature representation of the sample.

The prior knowledge is represented by an adjacent matrix, the adjacent matrix $A=[\alpha_{pq}]_{n \times n}$ represents an influence relationship among n processes in the production process, $\alpha_{pq} \in \{0,1\}$ indicates whether a $p^{th}$ process generates influence on production of a $q^{th}$ process, 0 indicates that no influence is generated, and 1 indicates that influence is generated.

The quality detection module is a two-layer full-connection network and is configured to classify the input feature representations of the samples and output predicted product quality.

Further, each of the feature extraction networks includes a plurality of multi-scale feature extraction modules that are connected sequentially, each of the multi-scale feature extraction modules includes two branches, a first branch first extracts a feature of the input feature representation corresponding to the production process data on time series through a one-dimensional convolutional network and then extract a feature on a variable dimension through a one-dimensional convolutional network with a same size to obtain a first branch feature, a second branch has a same structure as that of the first branch, convolutional kernels of the convolutional networks are different in size, the feature representation corresponding to the production process data is input, a second branch feature is output, then the first branch feature and the second branch feature are added and fused to serve as an output feature of the multi-scale feature extraction module, and the output feature is input to a next cascaded multi-scale feature extraction module until a last multi-scale feature extraction module outputs the feature representation of the sample.

S4: training the product quality detection model in the complex industrial process fusing the prior knowledge by the training data set to obtain the trained product quality detection model in the complex industrial process fusing the prior knowledge.

S4.1: the production process data of each process in the samples in the training data set is respectively input into the corresponding feature extraction network to obtain the feature representation corresponding to the production process data of each process.

Specifically, a feature extraction network in S4.1 is a multi-scale feature extraction network based on a convolutional neural network designed for the characteristics of data in the process.

A feature extraction process of the feature extraction network is as follows:

$$z_p = f_p(X^p).$$

Where $z_p$ is the feature representation of the $p^{th}$ process, and $f_p(\bullet)$ represents the feature extraction network corresponding to the $p^{th}$ process. To acquire the data feature on multiple scales, a multi-scale feature extraction module designed by the present invention adopts the convolutional kernels with various sizes to perform feature parallel extraction on the data.

Specifically, convolutional kernels $W_{t1}$ and $W_{t2}$ of $1 \times k_1$ and $1 \times k_2$ are adopted to slidingly extract features on different time scales, convolutional kernels $W_{s1}$ and $W_{s2}$ of $k_1 \times 1$ and $k_2 \times 1$ are adopted to extract features on different variable scales, and $k_1$ and $k_2$ are sizes of the convolutional kernels.

The multi-scale feature extraction module is as follows:

$$z_{p\_out} = W_{s1} \times (W_{t2} \times z_{p\_in}) + W_{s2} \times (W_{t2} \times z_{p\_in}).$$

Where $z_{p\_in}$ represents an input feature of the feature extraction module, $z_{p\_out}$ represents an output feature, $W_{t1}$ is the convolutional kernel of a first convolutional network in the first branch, $W_{s1}$ is the convolutional kernel of a second convolutional network in the first branch, $W_{t2}$ is the convolutional kernel of a first convolutional network in the second branch, and $W_{s2}$ is the convolutional kernel of a second convolutional network in the second branch. In this embodiment, $k_1 = 3$ and $k_2 = 5$.

S4.2: a production technology in the thick plate production process is analyzed to obtain the mutual influence among the processes to serve as the prior knowledge. The production process and technology of the thick plate products are relatively fixed, so that the relatively universal prior knowledge in the production process can be extracted conveniently.

Specifically, in this example, the sequence and internal influences of the processes in the thick plate production are considered, with A=[1,1,1;0,1,1;0,0,1].

S4.3: performing feature fusion on the feature representation corresponding to the extracted production process data of each process by the obtained prior knowledge to finally obtain the feature representation of the sample, and predicting the product quality by the quality detection module to obtain the predicted product quality.

Specifically, the feature fusion based on the prior knowledge in S4.3 is shown as the following formula:

$$\hat{y} = f_c(\text{Aconcat}(z_1, z_2, \ldots, z_n)).$$

Where $\hat{y}$ represents a predicted value of the product quality by the product quality detection model in the complex industrial process fusing the prior knowledge, concat($\bullet$) represents splicing operation of the feature representation of each process, and $f_c(\bullet)$ represents the quality detection module.

S4.4: after reaching set training rounds or converging a loss function, ending the training to obtain the trained product quality detection model in the complex industrial process fusing the prior knowledge.

Specifically, the loss function in S4.4 is a cross entropy loss function, and a loss between the quality predicted value $\hat{y}$ and a real value y is calculated by a cross entropy loss $L_{CE}$, as shown in the following formula:

$$L_{CE} = -\sum_{j=1}^{c} y_j \log(\hat{y}_j).$$

Where c represents a number of product quality types, j is a serial number of the product quality types.

S5: deploying the trained quality detection model in the complex industrial process fusing the prior knowledge for product quality detection in the complex industrial process to obtain product quality.

In this example, the trained quality detection model in the complex industrial process fusing the prior knowledge is deployed in a server of a digitized factory. When production starts, first, step S1 is performed to acquire data information in the production process; Then, step S2 is performed to preprocess the acquired data; and finally, the preprocessed data is input into the trained product quality detection model in step S3 to predict the final product quality.

To show the effect of the present invention in thick plate detection, a corresponding plate shape quality detection model is trained and tested on a data set D collected in S2. In this example, the recall rate, the accuracy and the effect of a F1-Socre indicator evaluation model are adopted, and WA represents the weighted average result of each indicator. The result is shown in the following table.

TABLE 1

The result of the method provided by the present invention in thick plate shape quality detection (%)

| Indicator | Bending | Horizontal wave | Left wave | Right wave | Normal | WA |
| --- | --- | --- | --- | --- | --- | --- |
| Accuracy | 74.66 | 76.03 | 86.85 | 79.17 | 90.74 | 86.48 |
| Recall rate | 63.79 | 60.11 | 91.65 | 49.84 | 93.52 | 86.90 |
| F1-Socre | 68.79 | 67.14 | 89.19 | 61.17 | 92.11 | 86.48 |

Finally, it should be noted that the above embodiments are only used for describing the technical solutions of the present invention, but not for limitation; although the present invention has been described in detail with reference to the foregoing embodiments, those ordinary skill in the art should understand that: they can still make modifications to the technical solutions described in the foregoing embodiments, or make equivalent replacements to some or all technical characteristics; and these modifications or replacements do not make the essence of the corresponding technical solutions deviate from the scope defined by the claims of the present application.

What is claimed is:

1. A product quality detection method in a complex industrial process fusing prior knowledge, comprising the following steps:

S1: acquiring samples of product production in the complex industrial process;

wherein the samples comprise production process data of each process acquired by each detection sensor in a production process and a product quality label marked after the product production is completed;

S2: preprocessing the acquired samples, and constructing a training data set by the preprocessed samples, wherein the preprocessing comprises data cleaning, data alignment and normalization;

wherein S2 specifically comprises:

S2.1: cleaning the acquired samples by a data cleaning algorithm, and removing samples comprising sampling anomalies and not-a-number values in the acquired production process data to obtain cleaned samples;

S2.2: performing the data alignment and the data normalization on the cleaned samples and constructing the training data set;

specifically, first, the production process data in the cleaned samples is subjected to data alignment operation, so that the production process data of each aligned sample have a same length m, then, the aligned production process data is subjected to normalization operation, and finally, production process data $X^P$ corresponding to each process after preprocessing is obtained, p being a serial number of processes and p=1,2, . . . ,n, and n being the number of the corresponding processes in the production process; therefore, each preprocessed sample is represented by $X_i=\{X^1, X^2, \ldots, X^n\}$, and i is a serial number of the preprocessed samples, so that the training data set $$D = \{X_i, y_i\}_{i=1}^{N}$$

is finally obtained, N being a number of the preprocessed samples, and $y_i$ being the product quality label corresponding to the preprocessed samples $X_i$;

S3: constructing a product quality detection model in the complex industrial process fusing the prior knowledge; wherein the product quality detection model in the complex industrial process fusing the prior knowledge comprises a plurality of feature extraction networks, a feature fusion module and a quality detection module;

the feature extraction networks are configured to perform feature extraction on the production process data in each process to obtain a feature representation corresponding to the production process data of each process; a number of the feature extraction networks equals a number of the corresponding processes in the production process, one feature extraction network corresponds to one process;

the feature fusion module is configured to splice input feature representation corresponding to the production process data of each process to obtain a spliced feature representation, then take mutual influence of each process as the prior knowledge, and fuse the spliced feature representation by the prior knowledge to finally obtain the feature representation of a corresponding preprocessed sample;

the prior knowledge is represented by an adjacent matrix, the adjacent matrix $A=[\alpha_{pq}]_{n\times n}$ represents an influence relationship among n processes in the production process, $\alpha_{pq} \in \{0,1\}$ indicates whether a $p^{th}$ process generates influence on production of a $q^{th}$ process, 0 indicates that no influence is generated, and 1 indicates that influence is generated;

the quality detection module is a two-layer full-connection network and is configured to classify input feature representations of the preprocessed samples and output predicted product quality;

S4: training the product quality detection model in the complex industrial process fusing the prior knowledge by the training data set to obtain a trained product quality detection model in the complex industrial process fusing the prior knowledge;

wherein S4 specifically comprises:

S4.1: respectively inputting the production process data of each process in the preprocessed samples in the training data set into a corresponding feature extraction network to obtain the feature representation corresponding to the production process data of each process;

a feature extraction process of the feature extraction networks is as follows:

$$z_p = f_p(X^p),$$

wherein $z_p$ is the feature representation of the $p^{th}$ process, and $f_p(\bullet)$ represents a feature extraction network corresponding to the $p^{th}$ process;

a multi-scale feature extraction module in each feature extraction network adopts convolutional kernels with various sizes to perform feature parallel extraction; specifically, convolutional kernels $W_{t1}$ and $W_{t2}$ of $1\times k_1$ and $1\times k_2$ are adopted to extract features on time scales, convolutional kernels $W_{s1}$ and $W_{t2}$ of $k_1\times 1$ and $k_2\times 1$ are respectively adopted to extract features on variable scales, and $k_1$ and $k_2$ are sizes of the convolutional kernels;

the multi-scale feature extraction module is as follows:

$$z_{p\_out} = W_{s1} \times (W_{t1} \times z_{p\_in}) + W_{s2} \times (W_{t2} \times z_{p\_in}),$$

wherein $z_{p\_in}$ represents an input feature of the feature extraction module, $z_{p\_out}$ represents an output feature, $W_{t1}$ is a convolutional kernel of a first convolutional network in a first branch, $W_{s1}$ is a convolutional kernel of a second convolutional network in the first branch, $W_{t2}$ is a convolutional kernel of a first convolutional network in a second branch, and $W_{s2}$ is a convolutional kernel of a second convolutional network in the second branch;

S4.2: analyzing a production technology in the complex industrial process to obtain the mutual influence among the processes to serve as the prior knowledge;

S4.3: performing feature fusion on the feature representation corresponding to an extracted production process data of each process by the obtained prior knowledge to finally obtain the feature representation of a corresponding sample, and predicting the product quality by the quality detection module to obtain the predicted product quality;

specifically, the feature fusion based on the prior knowledge in S4.3 is shown as the following formula:

$$\hat{y}=f_c(A\text{concat}(z_1,z_2,\ldots,z_n)),$$

wherein $\hat{y}$ represents a predicted value of the product quality by the product quality detection model in the complex industrial process fusing the prior knowledge, concat(•) represents splicing operation of the feature representation of each process, $f_c(\cdot)$ represents the quality detection module, A represents the adjacent matrix, and $z_n$ represents the feature representation of the $n^{th}$ process;

S4.4: after reaching set training rounds or converging a loss function, ending the training to obtain the trained product quality detection model in the complex industrial process fusing the prior knowledge;

specifically, the loss function in S4.4 is a cross entropy loss function, and a loss between a product quality predicted value and a product quality real value is calculated by a cross entropy loss $L_{CE}$, as shown in the following formula:

$$L_{CE}=-\sum_{j=1}^{c}y_j\log(\hat{y}_j),$$

wherein c represents a number of product quality types, j is a serial number of the product quality types, $\hat{y}_j$ is the product quality real value, and $\hat{y}_j$ is the product quality predicted value;

S5: deploying a trained quality detection model in the complex industrial process fusing the prior knowledge for product quality detection in the complex industrial process to obtain product quality.

2. The product quality detection method in the complex industrial process fusing the prior knowledge according to claim 1, wherein the data alignment in S2.2 adopts a linear interpolation algorithm.

3. The product quality detection method in the complex industrial process fusing the prior knowledge according to claim 1, wherein each of the feature extraction networks comprises a plurality of multi-scale feature extraction modules that are connected sequentially, each of the multi-scale feature extraction modules comprises two branches, a first branch first extracts a feature of the input feature representation corresponding to the production process data on time series through a one-dimensional convolutional network and then extract a feature on a variable dimension through a one-dimensional convolutional network with a same size to obtain a first branch feature, convolutional kernels of a second branch are different from the convolutional kernels of the first branch, the feature representation corresponding to the production process data is input, a second branch feature is output, then the first branch feature and the second branch feature are added and fused to serve as an output feature of a first multi-scale feature extraction module, and the output feature is input to a next cascaded multi-scale feature extraction module until a last multi-scale feature extraction module outputs the feature representation of the corresponding preprocessed sample.

* * * * *